(No Model.)
J. T. PAYNE.
Wheel Cultivator.
No. 235,012. Patented Nov. 30, 1880.
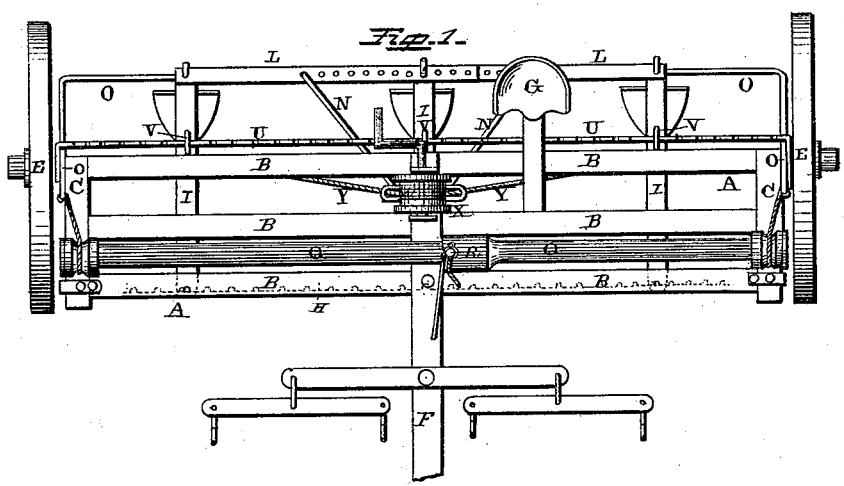
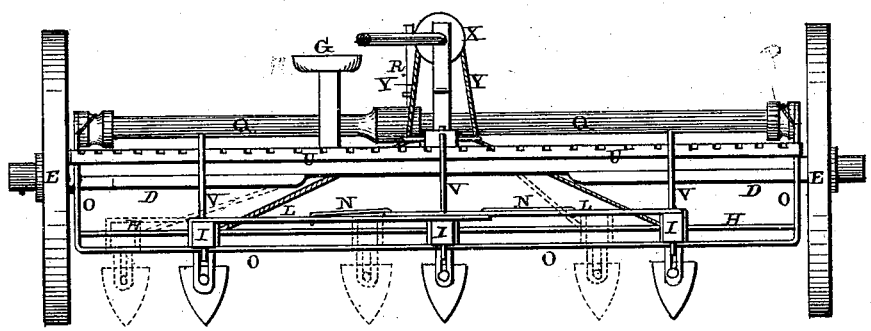
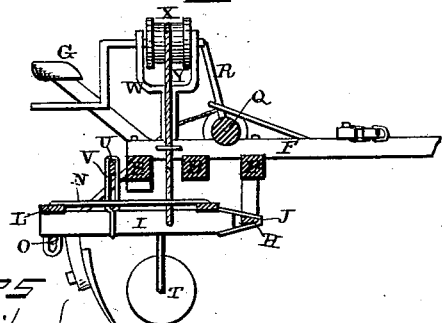
Witnesses
Wm. W. Mortimer
A. C. Kiskadden
Inventor
J. T. Payne,
per
F. A. Lehmann,
Atty.

UNITED STATES PATENT OFFICE.

JOHN T. PAYNE, OF WHITE STONE, VIRGINIA.

WHEEL-CULTIVATOR.

SPECIFICATION forming part of Letters Patent No. 235,012, dated November 30, 1880.

Application filed October 11, 1880. (No model.)

*To all whom it may concern:*

Be it known that I, JOHN T. PAYNE, of White Stone, in the county of Lancaster and State of Virginia, have invented certain new and useful Improvements in Wheel-Cultivators; and I do hereby declare the following to be a full, clear, and exact description of the invention, such as will enable others skilled in the art to which it pertains to make and use it, reference being had to the accompanying drawings, which form part of this specification.

My invention relates to an improvement in cultivators; and it consists in the combination and arrangement of devices, which will be more fully described hereinafter, whereby the plows or cultivators can be adjusted back and forth between the supporting-wheels, and can be adjusted nearer to or farther from each other, according to the nature of the work to be performed.

The object of my invention is to enable the plows not only to be moved back and forth upon the frame, so that they can be made to run nearer to one wheel than the other, but to enable them to be adjusted any desired distance apart, so that they can be used in laying off rows as well as in cultivating crops.

Figure 1 is a plan view of my invention. Fig. 2 is a rear view of the same. Fig. 3 is a vertical cross-section.

A represents the frame, which is composed of the three parallel beams B, which are united together at their ends by means of the beams C. To the under side of the rear one of the three beams B are secured the two short axles D, upon which the driving-wheels E are placed in the usual manner. To the top of the center of the frame A is secured the tongue F, and to one side of this tongue, upon the frame, is secured the driver's seat G.

At a suitable distance below the front one of the parallel beams which form the frame A is secured in any suitable manner the notched flat bar H, to which the front ends of the cultivator-beams I are fastened by means of the loops J. These loops are made a good deal longer than the bar is made wide, so as to allow the beams to be freely adjusted laterally back and forth upon the bar, according as it is desired to use the plows or cultivators nearer to one of the driving-wheels than the other.

The beams I are secured together by the perforated plates L, which are secured to both the front and their rear ends, and which plates overlap each other at their inner ends, so that the holding-pin can be passed through the perforations, and thus adjust the beams nearer to or farther apart from each other. These two sets of plates L are fastened or braced together by means of the rods N, so as to cause them to move smoothly and evenly together.

The rear ends of the beams I are supported and moved upon the rod O, which rod has its two ends bent at right angles and turned forward, so as to pass through suitable guides formed upon the rear corners of the frame A. To the front ends of these two ends of the rod O are fastened suitable chains, cords, or wires, which extend forward and pass around the drums P upon each end of the shaft Q. This shaft is journaled in suitable bearings which are secured to each end of the frame A, and by turning the shaft forward the ends of the rod O are drawn forward so as to draw the rod both forward and upward. When the shaft Q is turned forward so that its lever R will be caught in its catch, the plows or cultivators will be raised above the ground, so that the machine can be moved freely from place to place. When, however, this shaft Q is released the plows or cultivators fall by their own weight to the ground.

Each one of the plows or cultivators here used is made with double mold-boards, so as to adapt them both for laying off the ground in which to plant the corn and to cultivate the crop afterward. To the under side of the beams, in front of each plow or cultivator, is attached a revolving colter, T. Secured to the rear of the frame A is a flat bar, U, which is notched in its upper edge from one end to the other, and which serves as a means for the supporting devices V to catch in. These supporting devices pass around the beams I between the colters and the plows or cultivators, and then pass up over this notched bar. While the plows are in use these supporting devices prevent them from running below a certain uniform depth, and by catching in the notches in the bar keep the beams always in place.

Upon the top of the rear end of the tongue is placed a standard, W, which has its upper end forked, and in the upper end of this standard is supported a drum or roller, X, around which the upper ends of the two chains Y are wound. The lower ends of these two chains Y pass down through suitable guides upon each side of the tongue or upon the frame, and have their lower ends fastened to the two outer beams, I. By turning this drum, which is provided with a suitable cranked handle, the three beams I can be moved toward either driving-wheel, as the driver may prefer. The three beams I, being secured together both at their rear and front ends by the perforated plates L, form, as it were, a single frame, and when the drum is turned in one direction this frame is drawn along upon the flat notched bar in front and upon the supporting-rod by which the rear ends of the beams are raised above the ground. While the plows or cultivators are in the ground the guiding-loops or clevises, which are secured to the front end of the beams I, catch in the notches in the flat bar, which extends along under the front edge of the frame A, and by these loops or clevises the bars are both drawn along and held in their relative positions.

In addition to the three plow-beams with double shovels, as here shown, there are to be three beams with single shovels. The three double shovels are intended for laying off and checking the ground, and the three single ones for working the crops.

Having thus described my invention, I claim—

1. The combination of a frame, A, supported upon wheels, the beams I, united together by means of perforated plates and secured to the frame by means of the notched bar which extends along under the front edge of the frame, and provided with a suitable elevating device, whereby the beams can be raised above and lowered to the ground, substantially as shown.

2. The combination of the frame A, the notched bars H U, beams I, secured together by the plates L, and provided with the clevises J and supporting devices V, an elevating mechanism for raising and lowering the plows, and a mechanism for moving them back and forth on the frame, substantially as described.

In testimony that I claim the foregoing I have hereunto set my hand this 1st day of October, 1880.

JOHN THOMAS PAYNE.

Witnesses:
R. R. DUNAWAY,
GEO. W. SANDERS.